United States Patent [19]
Basak et al.

[11] Patent Number: 6,122,673
[45] Date of Patent: Sep. 19, 2000

[54] PORT SCHEDULER AND METHOD FOR SCHEDULING SERVICE PROVIDING GUARANTEES, HIERARCHICAL RATE LIMITING WITH/WITHOUT OVERBOOKING CAPABILITY

[75] Inventors: Debashis Basak, Allison Park; Fan Zhou, Cranberry, both of Pa.; Surya Pappu, Santa Clara, Calif.

[73] Assignee: FORE Systems, Inc., Warrendale, Pa.

[21] Appl. No.: 09/120,697

[22] Filed: Jul. 22, 1998

[51] Int. Cl.$^7$ ...................................................... G06F 13/00
[52] U.S. Cl. ......................... 709/238; 709/104; 709/226; 370/412; 370/429
[58] Field of Search .................................. 709/223, 225, 709/226, 238, 102, 104, 105; 370/395, 412, 428, 429

[56] References Cited

U.S. PATENT DOCUMENTS

| | | | |
|---|---|---|---|
| 5,828,878 | 10/1998 | Bennett | 709/102 |
| 5,850,399 | 12/1998 | Ganmukhi et al. | 370/412 |
| 5,905,730 | 5/1999 | Yang et al. | 370/429 |
| 5,991,812 | 11/1999 | Srinivasan | 709/232 |
| 6,038,217 | 3/2000 | Lyles | 370/233 |

*Primary Examiner*—Viet D. Vu
*Attorney, Agent, or Firm*—Ansel M. Schwartz

[57] ABSTRACT

A scheduler for controlling when entities are operated upon by the server. The scheduler includes N entities, where N is an integer greater than or equal to 2. Each entity has a rate at which it is to receive service from the server. The scheduler includes a memory having finishing times $f_i$ of the N entities, where $f_i$ corresponds to the time the i'th entity is to be operated upon by the server. The scheduler includes a virtual clock that keeps track of virtual time so the finishing times $f_i$ can be identified. The scheduler includes a controller which chooses entities to be operated upon by the server as a function of the finishing times. The controller slows virtual time to provide service to the entities. The controller is connected to the virtual clock and the memory. A scheduler for controlling when entities are operated upon the server. The scheduler includes N entities, where N is an integer greater than or equal to 2. Each entity has a rate at which it is to receive service from the server. At least a first entity of the N entities has a plurality of connections, and the controller chooses the first entity to provide service when at least one of the plurality of connections is waiting for service and has a finishing time which is the earliest finishing time of the entities waiting for service.

20 Claims, 10 Drawing Sheets

FIG.2
(PRIOR ART)

EACH SESSION HAS A NEXT START AND FINISH RATE: (S.F.), WHERE F = S + π

FIG.1
(PRIOR ART)

| t      | 0     | —  | 4     | 5     | —  | 10000          | 10001          | 10002          |
|--------|-------|----|-------|-------|----|----------------|----------------|----------------|
| Y(t)   | 0     | —  | 4     | 4     | —  | 6669           | 6669           | 6670           |
| (S0,F0)| (0.2) | —  | (2.4) | (4.6) | —  | (6668.6670)    | (6670.6672)    | (6670.6672)    |
| (S1,F1)| (0.1) | —  | (3.4) | (3.4) | —  | (6668.6669)    | (6668.6669)    | (6669.6670)    |
| (S2,F2)| ⊘     | —  |       |       | —  | (6669.6670)    | (6669.6670)    | (6669.6670)    |

SESSIONS C0 C1 ARE CONTINUOUSLY BACKLOGGED FROM t = 0.
C2 BECOMES BACKLOGGED AT t = 10000.

*FIG. 4*

| t      | 0     | 1     | 2     | —  | 10000         | 10001         | —  | 15000          |
|--------|-------|-------|-------|----|---------------|---------------|----|----------------|
| Y(t)   | 0     | 1     | 2     | —  | 10000         | 10001         | —  | 15000          |
| (S0,F0)| (0.2) | (0.2) | (2.4) | —  | (6668.6670)   | (6670.6672)   | —  | (10000.10002)  |
| (S1,F1)| (0.1) | (1.2) | (1.2) | —  | (6668.6669)   | (6668.6669)   | —  | (10000.10001)  |
| (S2,F2)| ⊘     | ⊘     | ⊘     | —  | (10000.10001) | (10000.10001) | —  | (10000.10001)  |

SESSION C0 C1 ARE CONTINUOUSLY BACKEDLOGGED FROM t = 0.
C2 BECOMES BACKEDLOGGED AT t = 10000.

PORT SCHEDULER AND METHOD FOR SCHEDULING SERVICE PROVIDING GUARANTEES, HIERARCHICAL RATE LIMITING WITH/WITHOUT OVERBOOKING CAPABILITY

FIELD OF THE INVENTION

The present invention is related to a scheduler for scheduling when a server provides service to entities. More specifically, the present invention is related to a method and apparatus for a hierarchical rate limiting ATM scheduler with overbooking.

BACKGROUND OF THE INVENTION

In the past, various scheduling schemes have been proposed based on packet fair queuing [A. Parekh. *A Generalized Processor Sharing Approach to Flow Control in Integrated Services Network*. PhD thesis, Massachusetts Institute of Technology, 1992; S. Golestani. A self-clocked fair queuing scheme for broadband applications. In *INFOCOM'94*, pages 636–646, June 1994; J. C. R. Bennett and H. Zhang. Wf²q: Worst-case fair weighted weighted fair queuing. In *INFOCOM'96*, pages 120–128, March 1996; J. C. R. Bennett, D. C. Stephens, and H. Zhang. High Speed, Scalable, and Accurate Implementation of Fair Queuing Algorithms in ATM Networks. In *ICNP'97*, March 1997; S. Suri, G. Varghese, and G. Chandramenon. Leap Forward Fair Queuing. In *INFOCOM'97*, April 1997; D. Stilliadis and A. Varma. Design and Analysis of Frame-Based Fair Queuing: A New Traffic Scheduling Algorithm for Packet-Switched Networks. In *ACM SIGMETRICS'96*, May 1996; J. L. Rexford, A. G. Greenberg, and F. G. Bonomi. Hardware-efficient Fair Queuing Architectures for High Speed Networks. In *INFOCOM'96*, March 1996]. These schemes typically require the maintenance of a clock and time-stamps for each session. Sessions are sorted based on their time-stamps and served out in that order. Proposed variants of this scheme primarily differ in the way they update the clock and session time-stamps. Similarly, they vary in the jitter introduced in the service, see J. C. R. Bennett and H. Zhang. Wf²q: Worst-case fair weighted weighted fair queuing. In *INFOCOM'96*, pages 120–128, March 1996.

There are two major costs associated with the arbitration among sessions: the computation of the virtual time function, which is a dynamic measure of the normalized fair amount of service that should be received by each session, and the management of the priority queue to order the transmissions from different sessions, which has a complexity of O(log N), where N is the number of sessions.

J. C. R. Bennett, D. C. Stephens, and H. Zhang. High Speed, Scalable, and Accurate Implementation of Fair Queuing Algorithms in ATM Networks. In *ICNP'97*, March 1997, is an example of sample architectures to alleviate the above costs. In J. C. R. Bennett, D. C. Stephens, and H. Zhang. High Speed, Scalable, and Accurate Implementation of Fair Queuing Algorithms in ATM Networks. In *ICNP'97*, March 1997, the server is restricted to support a fixed number of rates. Sessions with the same rate are grouped together. It is demonstrated that a priority relationship can be maintained among sessions belonging to the same rate group without sorting. The problem is then reduced from one that schedules among all sessions to one that schedules among all sessions at the head of the groups. With such an implementation, the complexities for both priority management and virtual time computation grow with the number of discrete rates supported rather than number of sessions.

Earlier research and patents have demonstrated implementations of Packet Fair Queuing (PFQ) [J. C. R. Bennett and H. Zhang. Wf²q: Worst-case fair weighted weighted fair queuing. In *INFOCOM'96*, pages 120–128, March 1996; J. C. R. Bennett and H. Zhang. Hierarchical Packet Fair Queuing Algorithms. In *ACM SIGCOMM'96*, pages 143–156, August 1996; J. L. Rexford, A. G. Greenberg, and F. G. Bonomi. Hardware-efficient Fair Queuing Architectures for High Speed Networks. In *INFOCOM'96*, March 1996; J. C. R. Bennett, D. C. Stephens, and H. Zhang. High Speed, Scalable, and Accurate Implementation of Fair Queuing Algorithms in ATM Networks. In *ICNP'97*, March 1997] to make bandwidth guarantees. As an example of prior art, an embodiment of such a PFQ scheme is shown. The scheme described below allocates bandwidth among sessions so as to meet their rates. A session is not allowed to receive bandwidth more than its requested rate.

Figure 1:
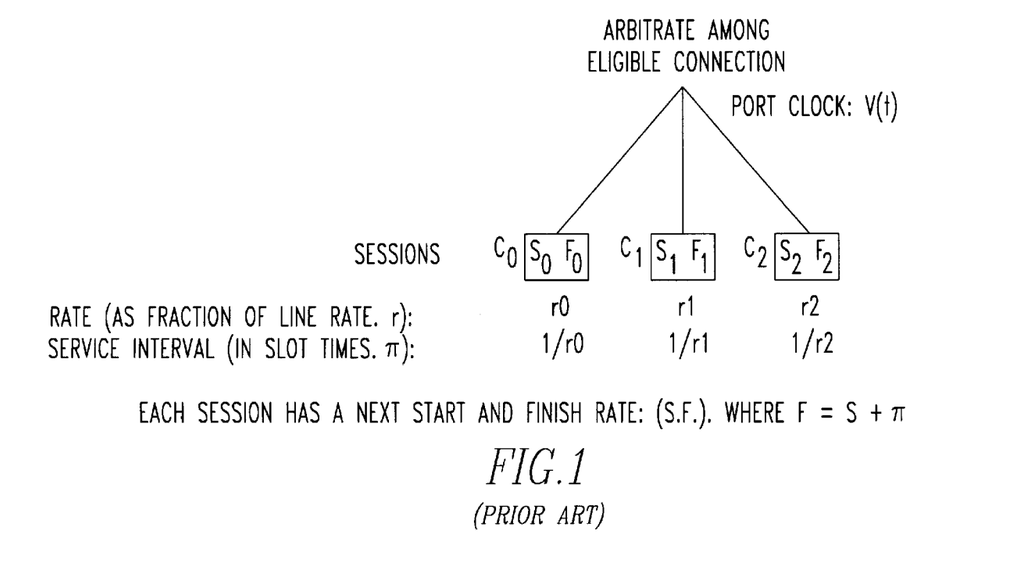
FIG. 1 depicts a prior art virtual clock and start/finish times of sessions maintained in a typical PFQ scheme.

Each session $C_i$ has a requested service rate, $r_i$, represented in FIG. 1 as a fraction of line rate. The basic idea is that a session should be served once every $1/r_i$ cell slot times. This interval is referred to as the session's time interval ($TI_i$). The session which has not been served in the last $TI_i$ cell times should be served as soon as possible. For each session a Start Time ($S_i$) is maintained to indicate earliest time when it is eligible to be scheduled. A finish time for each session, $F_i$, is also maintained and is derived as $F_i = S_i + TI_i$. Sessions are served out based on their finish times. The details of the algorithm are provided below:

Virtual time, updated every port cycle is defined as follows for a given port:

$$V(t+1) = V(t) + 1,$$

There are other more complex virtual time functions proposed in literature, but most assume monotonically increasing functions, similar to the one in the above equation.

Let a session i be scheduled at time t. If the session is backlogged, a cell is served out, else the cycle is wasted. Its new start and finish times $S_i(t+)$ and $F_i(t+)$ are updated as follows:

$$S_i(t+) = F_i(t), \text{ and } F_i(t+) = S_i(t+) + L/r_i,$$

where

L is the length of a cell and $r_i$ is the session rate.

When a new session i joins at time t, its start time is assigned as:

$$S_i(t) = V(t) \text{ and } F_i(t) = S_i(t) + L/r.$$

At port slot time t, among all the active (backlogged) sessions the eligible ones are determined as those with:

$$S_i(t) \leq V(t).$$

Among the eligible sessions the one with the smallest finish time, $F_i(t)$, is picked for service.

Note, that in the above scheme, a session is inserted into the scheduler during session setup. It remains there until the session is torn down. It is expected that the sum total of rates of all sessions is less than or equal to line rate (LR). One of the problems with the scheme in implementing overbooking is the following. An inactive (not backlogged) session may be scheduled, but not have cells, leading to the cycle being wasted. This is assuming the practical constraint that hardware does not have time to iterate the algorithm and determine a non-empty connection. In case of overbooking, the wasted cycle could have been used by another backlogged session. This problem can be solved by removing inactive sessions from the scheduler, such that the scheduler can only schedule among sessions which have cells. The above scheme requires the following modifications:

After being served, if the session is no longer backlogged, it is removed from the list of active sessions arbitrating for port bandwidth.

An inactive session i, becoming active (or backlogged) at time t, is put back into the scheduler arbitration process. Its new start time is assigned as follows:

$$S_i(t)=\max(S_i(t-), V(t)) \text{ and } F_i(t)=S_i(t)+L/r.$$

The maximum function in the equation above, ensures that a session is not served prior to $S_i(t-)$. If a session becomes empty after its last service and then backlogged again before its next scheduled start time, resetting its start time to virtual clock can lead to it getting more than its requested rate.

However, even with the modified implementation, there is a further problem in using it in an overbooking scenario, as discussed below. A general comment on PFQ implementation feasibility is necessary at this point. Determining the minimum finish time, among sessions, requires a minimum computation among all active sessions. Given a large number of sessions, this is not possible in a cell slot time. Earlier schemes have proposed maintaining sorted heaps of sessions based on their time-stamps to solve this problem. Similarly, a rate grouping scheme was proposed in [J. C. R. Bennett and H. Zhang. Wf²q: Worst-case fair weighted weighted fair queuing. In *INFOCOM'96*, pages 120–128, March 1996]. The present invention works with any of such schemes to determine the minimum finish time among all sessions.

Earlier proposed implementations of PFQ schemes can implement rate limiting (the first bullet in the above itemization), by programming rate limits as the desired rates. However, in case of overbooking, the expected behavior from these implementations deviate significantly from desired behavior. Prior to analyzing the problems of implementing a rate limiting scheduler with overbooking capability using the earlier proposed PFQ schemes, a set of desired behavior from an ideal implementation is considered:

For an uncongested port (i.e. sum total of all incoming traffic to port is less than or equal to the line rate), a backlogged session is limited to receive up to its rate limit.

In case of congestion (the sum total of requested rate limits on backlogged sessions being greater than line rate), the scheme ensures each backlogged session receives a rate equal to its requested rate limit divided by the times the line rate is overbooked.

EXAMPLE

Figure 2:
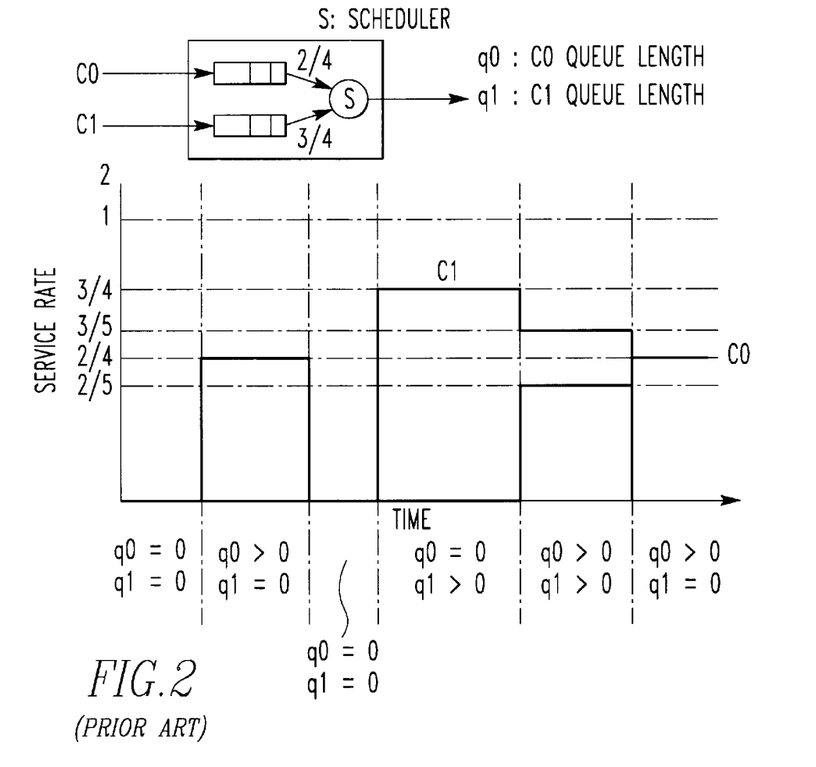
FIG. 2 is an example illustrating desired behavior in the presence of overbooking. Sessions C0 and C1 request rate limits of 2/4 and 3/4, respectively. Thus, when both are active simultaneously the line is overbooked. During such periods they receive 2/5 and 3/5 of line rates, respectively. Otherwise, they receive service at their requested rate limits.

FIG. 2 provides an example to illustrate this behavior. Two sessions C0 and C1 are destined to the same port. The arriving cells are buffered in separate queues. The scheduler serves them out. Sessions C0 and C1 are limited to rates of 2/4 and 3/4, respectively. This implies that at times when only C0 has cells in its queue, it is limited to a rate of 2/4. Similarly, when only C1 has cells in its queue, it is limited to a rate of 3/4. However, when both sessions have cells, the line rate is overbooked by a factor of 5/4. The service received by sessions are scaled back by the overbooking factor. In this situation, C0 and C1 receive 2/5 and 3/5 line rate, respectively.

An overbooked rate limiter implementation based on the previous scheme is considered. The scheme can lead to starvation of service among sessions. Though the illustration is based on a specific implementation, the problem being highlighted in an overbooked scenario is present in all variants of fair queuing algorithms which assume a monotonically increasing virtual time function in their implementation.

Figure 3:
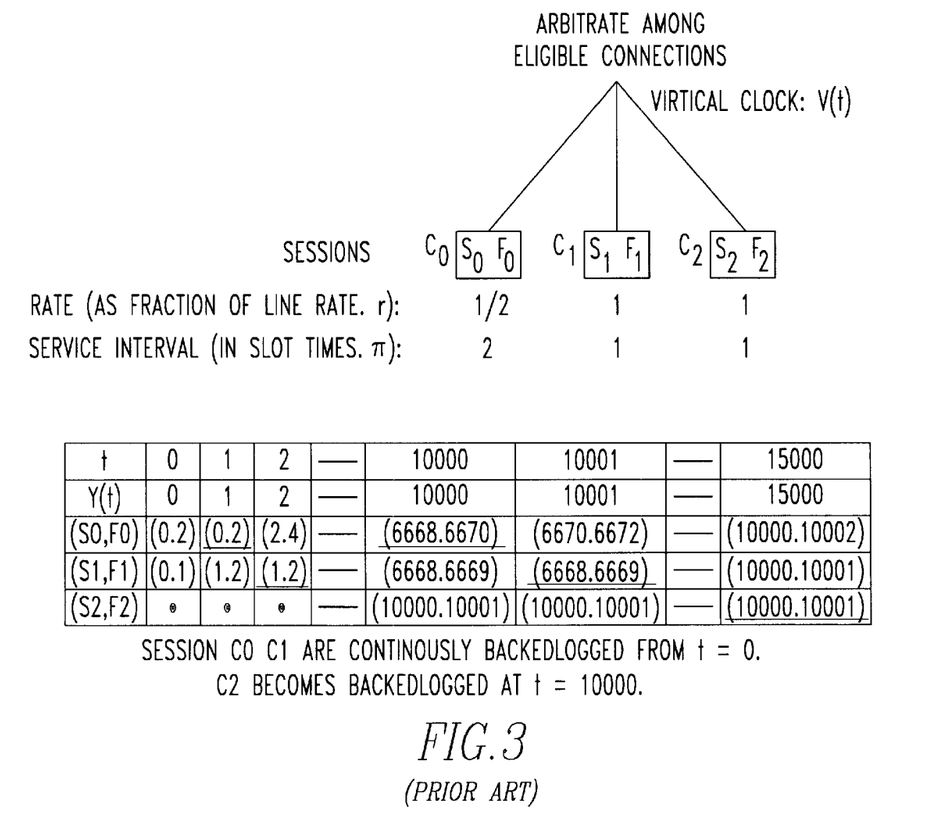
FIG. 3 is an example illustrating problems of starvation with an implementation of rate limiting with overbooking given a monotonically increasing virtual clock time function. Row 1 depicts progression in real time (t). Row 2 depicts corresponding values of V(t), same as t in this example. Rows 3, 4, and 5 depict the start and finish times for sessions C0, C1, and C2, respectively.

FIG. 3 illustrates an over-booked scenario with three sessions C0, C1, and C2 requesting limits of 1/2 , 1, and 1 line rate, respectively. Sessions C0 and C1 become active (backlogged) from time t=0, while session C2 becomes active only at a later time t=10,000. The table depicts the value of the virtual clock based on an increasing virtual clock implementation: V(t+1)=V(t)+1. It also depicts, in successive rows, the start and finish times of sessions C0, C1, and C2, respectively. For each slot time, t, the underlined start and finish time pair indicate the session which was served in a given cycle. The session to be served is chosen based on smallest finish time among the eligible sessions. In case of a tie among eligible sessions for the minimum finish time, the session with the earliest start time is chosen. The following observation can be made in the example:

The scheduler is overbooked with the rates requested by sessions C0 and C1. As time progresses, the start/finish times of these sessions increasingly lag behind the V(t). For example, at t=10,000, V(t)=10,000 is much ahead of $F_0=6670$ and $F_1=6669$.

Session C2 becoming active at t=10,000 is stamped a start time of $S_2=V(t)=10,000$.

Based on the criterion of serving the session with the minimum finish time, session C2 does not get served until sessions C0 and C1's finish times catch up with C2's finish time. It is beyond only this time that session C2 is served for the first time. This happens in the example at t=15000. Thus, C2 is not served for 5000 slot times. In general, a session may be starved for an arbitrary period of time after becoming active, depending on how far other sessions lag behind the virtual clock.

Thus, a monotonically increasing virtual clock, used for time stamping active sessions, leads to unfairness and starvation. This problem is observed in an over-booked scenario with any PFQ scheme where the virtual clock function is such that it can move arbitrarily ahead of the finish times of sessions.

SUMMARY OF THE INVENTION

The present invention pertains to a scheduler for controlling when entities are operated upon by the server. The scheduler comprises N entities, where N is an integer greater than or equal to 2. Each entity has a rate at which it is to receive service from the server. The scheduler comprises a memory having finishing times $f_i$ of the N entities, where $f_i$ corresponds to the time the i'th entity is to be operated upon by the server. The scheduler comprises a virtual clock that keeps track of virtual time so the finishing times $f_i$ can be identified. The scheduler comprises a controller which chooses entities to be operated upon by the server as a function of the finishing times. The controller slows virtual time to provide service to the entities. The controller is connected to the virtual clock and the memory.

The present invention pertains to a scheduler for controlling when entities are operated upon the server. The scheduler comprises N entities, where N is an integer greater than or equal to 2. Each entity has a rate at which it is to receive service from the server. At least a first entity of the N entities has a plurality of connections, and the controller chooses the first entity to provide service when at least one of the plurality of connections is waiting for service and has a finishing time which is the earliest finishing time of the entities waiting for service. The scheduler comprises a memory having finishing times $f_i$ of the N entities, where $f_i$ corresponds to the time the i'th entity is to be operated upon by the server. The scheduler comprises a virtual clock that keeps track of virtual time so the finishing times $f_i$ can be identified. The scheduler comprises a controller which chooses entities to be operated upon by the server as a function of the finishing times. The controller slows virtual time to provide service to the entities. The controller is connected to the virtual clock and the memory.

The present invention pertains to a method for scheduling service from a server. The method comprises the steps of receiving a first request from a first entity having a first rate for service from the server. Next there is the step of storing a finishing time in a memory when the first entity is to receive service from the first entity. Then there is the step of receiving a second request from a second entity having a second rate for service from the server. Next there is the step of storing the finishing time when the second entity is to receive service from the server in the memory. The finishing time of the second entity is the same finishing time as the first entity. Then there is the step of providing service to the first entity. Next there is the step of stopping virtual time. Then there is the step of providing service to the second entity from the server at the same virtual time that the first entity receives service from the server.

Desired features in an ATM scheduler of the present invention are the following.

1. Provisioning to meet the guaranteed bandwidth for sessions. Per-VC queuing is assumed.
2. Minimizing jitter. It is well established that large jitter (high cell celay variation) in serving out cells for a VC leads to burstiness which can cause cells to be dropped in downstream equipment. To minimize such problems the scheduler should serve out cells in a smooth manner.
3. Rate-limiting. In a heterogeneous networking environment, ATM switches often require to feed traffic into edge or ed-user equipment with limited buffering and bandwidth handling capabilities. Thus, heavy bursts of intermittent traffic destined to such equipment is bound to be dropped. Minimizing such losses is a problem of substantial interest. This objective can be achieved by allowing the network (or ATM switch) to feed traffic to the equipment at a rate it can handle. Bursts are buffered inside the network until they can be drained to the destination. To achieve the above objective, an ATM port scheduler should be capable of limiting traffic to a predetermined rate.
4. Hierarchical rate limiting. The above rate-limiting may be performed at the level of a single session (similar to out bound shaping) or at the level of a set of sessions bound to the same destination, e.g. a lower speed downstream port like T1 or an xDSL pipe. In this document, such a group of sessions is referred to as a virtual link. Hierarchical rate limiting requires limiting the rate at the aggregate virtual link (VL) level and also at the individual sessions in the VL.
5. Overbooking. At most times the incoming traffic on rate limited virtual links may be much smaller than its rate limit. Thus, reserving bandwidth for virtual links based on their rate limits can lead to vast underutilization of the port bandwidth. The solution to this problem requires a mechanism to overbook the rate limits on a port. Thus, the sum of the rate-limits on all virtual links belonging to a port may be greater than the port bandwidth (line rate).

This is especially useful with bursty and intermittent traffic. In the best case, the traffic on incoming sources may arrive staggered in a manner that each session receives requested rate. Thus, overbooking allows us to take advantage of the statistical multiplexing. In the worst case, if sessions arrive simultaneously, such that aggregate traffic exceeds line rate, then the mechanism should allow for a graceful degradation in service to sessions. Such mechanism forms par of the present invention.

6. Overbooking while meeting session guarantees. Degradation in service rate with overbooking may not be acceptable to some time sensitive sessions e.g. CBR, rt-VBR. Such sessions should be given higher priority in receiving service such that their service rates can always be met. The problem becomes more challenging when such sessions are part of a virtual link. For example, consider a virtual link requesting a rate limit of 10 Mbps. Let the VL consist of two sessions C0 and C1. Session C0 requesting a rate limit of 7 Mbps and C1 requesting a rate guarantee of 8 Mbps. When both sessions are active, the desired behavior is for C1 to receive its guaranteed 8 Mbps and C0 to receive less than or equal to 2 Mbps, such that aggregate is below the link rate limit of 10 Mbps. A mechanism to achieve such hierarchical rate limiting with overbooking while ensuring guarantees forms part of the apparatus proposed in this paper.

Here, it is important to note that while the aggregate bandwidth received by virtual link may need to be limited to a particular rate, the guarantees at individual session level for sessions belonging to the virtual link must still be met. To ensure the above, two relationships are necessary implied among the rates in the scheduler:

Sum total of session guarantees in a virtual link is less than the rate limit on the virtual link.

The sum total of all guarantees on all sessions is less than line (port) rate.

BRIEF DESCRIPTION OF THE DRAWINGS

In the accompanying drawings, the preferred embodiment of the invention and preferred methods of practicing the invention are illustrated in which.

DETAILED DESCRIPTION

Figure 9:
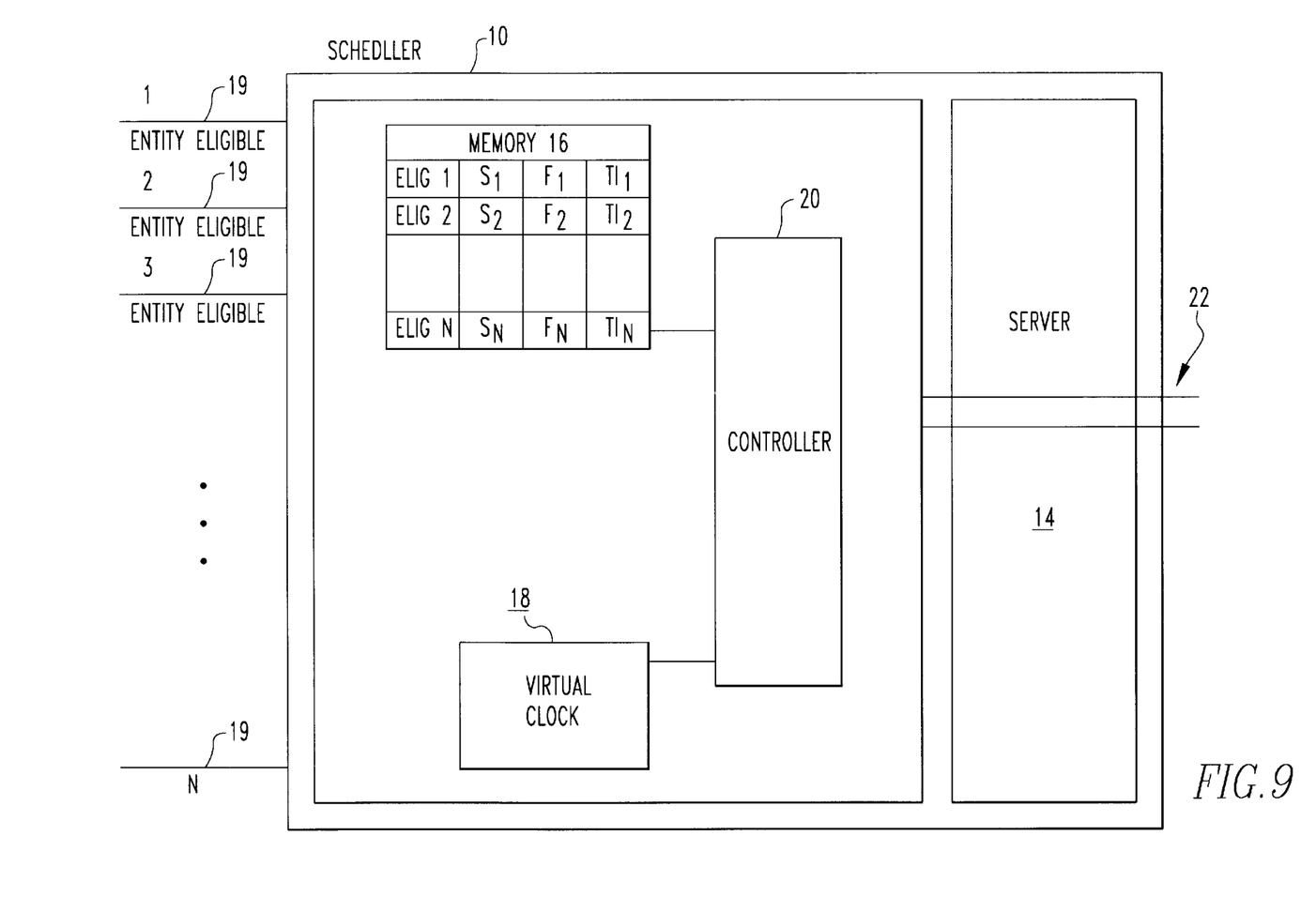
FIG. 9 is a schematic representation of a scheduler of the present invention.

Referring now to the drawings wherein like reference numerals refer to similar or identical parts throughout the several views, and more specifically to FIG. 9 thereof, there is shown a scheduler 10 for controlling when entities 12 are operated upon by the server 14. The scheduler 10 comprises N entities 12, where N is an integer greater than or equal to 1. Each entity has a rate at which it is to receive service from the server 14. The scheduler 10 comprises a memory 16 having finishing times $f_i$ of the N entities 12, where $f_i$ corresponds to the virtual time the i'th entity is to be operated upon by the server 14. The scheduler 10 comprises a virtual clock 18 that keeps track of virtual time so the finishing times $f_i$ can be identified. The scheduler 10 comprises a controller 20 which chooses entities 12 to be operated upon by the server 14 as a function of the finishing times. To facilitate overbooking, the controller 20 slows virtual time to provide service to the entities 12. The controller 20 is connected to the virtual clock 18 and the memory 16.

Each entity has a rate for requesting service from the server 14. The entities 12 could have a sum of rates greater than 1. The controller 20 preferably provides service to each entity as a function of each entity's rate and the amount the sum of the rates is greater than 1.

Preferably, to facilitate overbooking, the controller 20 causes virtual time to stop until all entities 12 having a finishing time equal to virtual time have received service from the server 14. The controller 20 preferably operates virtual time corresponding to $$V(t+1)=\min(V(t)+1, \minF),$$

where minF denotes the earliest finish time among all entities 12 having finishing times.

Figure 10:
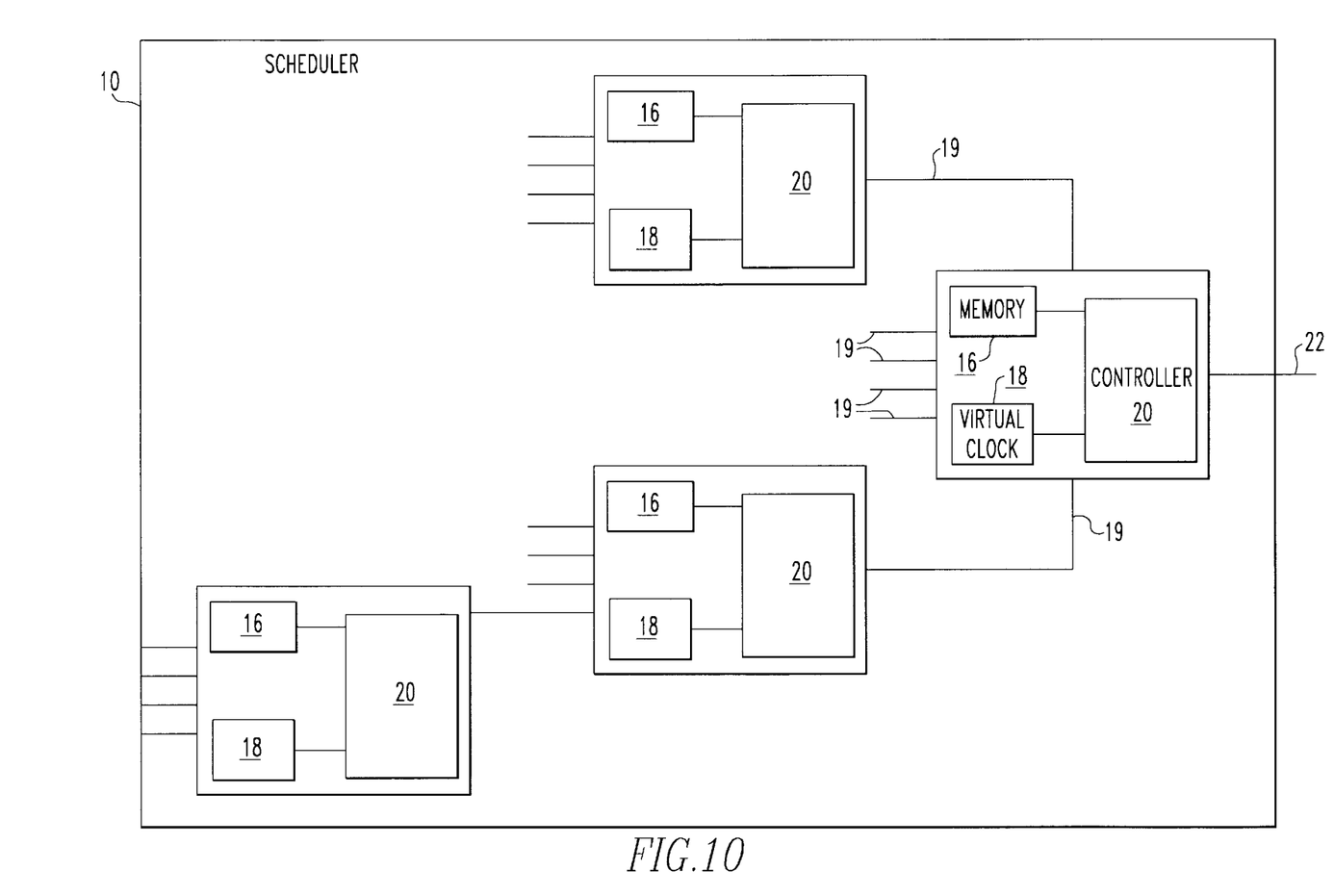
FIG. 10 is a schematic representation of a scheduler having a hierarchal architecture.

Preferably, the memory 16 has starting times $s_i$ of the N entities 12, where $1 \leq i < N$ and is an integer, and $s_i$ corresponds to the earliest time when i'th entity can request next service from the server 14 and the memory has rate limit times $TI_i$ of the N entities. The controller 20 preferably provides service to the entity with the earliest finishing time. As shown in FIG. 10, there is a hierarchy of controllers 20 such that at least a first entity of the N entities represents a plurality of entities in a controller 20 in a second tier, and a second entity in the second tier represents entities in a controller 20 in a third tier. A connection requiring service stores a time interval and start time in a memory associated with the controller to which the connection first connects in the scheduler. A controller connected to a lower level controller stores a time interval, start time, in the memory associated with the controller at the lower tier. The controller at the first tier chooses a first entity to provide service when the entity is eligible and has the earliest finish time of entities waiting for service and also updates the start and finish time of the entity in its local memory. The first entity includes another controller in the next tier. The other controller further chooses a second entity to provide service when the second entity is eligible and has the earliest finish time of entities waiting for service at the second controller, and also updates the start and finish time of the entity in its local memory. Each controller maintains a virtual clock independent of all other virtual clocks of other controllers of different tier or the same tier with all virtual clocks being updated based on finish times of eligible entities connected to it. All virtual clocks are incremented each cycle time. The minimum operation is performed on a virtual clock, to obtain the correct value of the clock, when its controller receives service, allowing the controller to use the correct value of the clock in a next level. The sum of rates of entities at a controller can be greater than 1, thus allowing the scheduler to be overbooked, and during congestion the controller ensures slowdown of virtual clock to reflect overbooking behavior. The rate received by an entity with no overbooking is equal to its rate but with overbooking the rate received by an entity is the minimum of its rate or its rate scaled down by the sum of rates of eligible entities at the controller.

Preferably, at least one of the entities 12 is guaranteed service from the server 14 when it has a finishing time with the earliest finishing time of the entities 12 waiting for service. The entity which is guaranteed service is preferably reviewed first by the controller 20 when the controller 20 is determining which entity is to receive service next to identify if the entity which is guaranteed service has the earliest finishing time of the entities 12 waiting for service.

The present invention pertains to a scheduler 10 for controlling when entities 12 are operated upon the server 14. The scheduler 10 comprises N entities 12, where N is an integer greater than or equal to 1. Each entity has a rate at which it is to receive service from the server 14. At least a first entity 121 of the N entities 12 has a plurality of connections, and the controller 20 chooses the first entity 121 to provide service when at least one of the plurality of connections is waiting for service and the first entity has a finishing time which is the earliest finishing time of the entities 12 waiting for service. The scheduler 10 comprises a memory 16 having finishing times $f_i$ of the N entities 12, where $f_i$ corresponds to the time the i'th entity is to be operated upon by the server 14. The scheduler 10 comprises a virtual clock 18 that keeps track of virtual time so the finishing times $f_i$ can be identified. The scheduler 10 comprises a controller 20 which chooses entities 12 to be operated upon by the server 14 as a function of the finishing times. The controller 20 slows virtual time to provide service to the entities 12. The controller 20 is connected to the virtual clock 18 and the memory 16.

Figure 12:
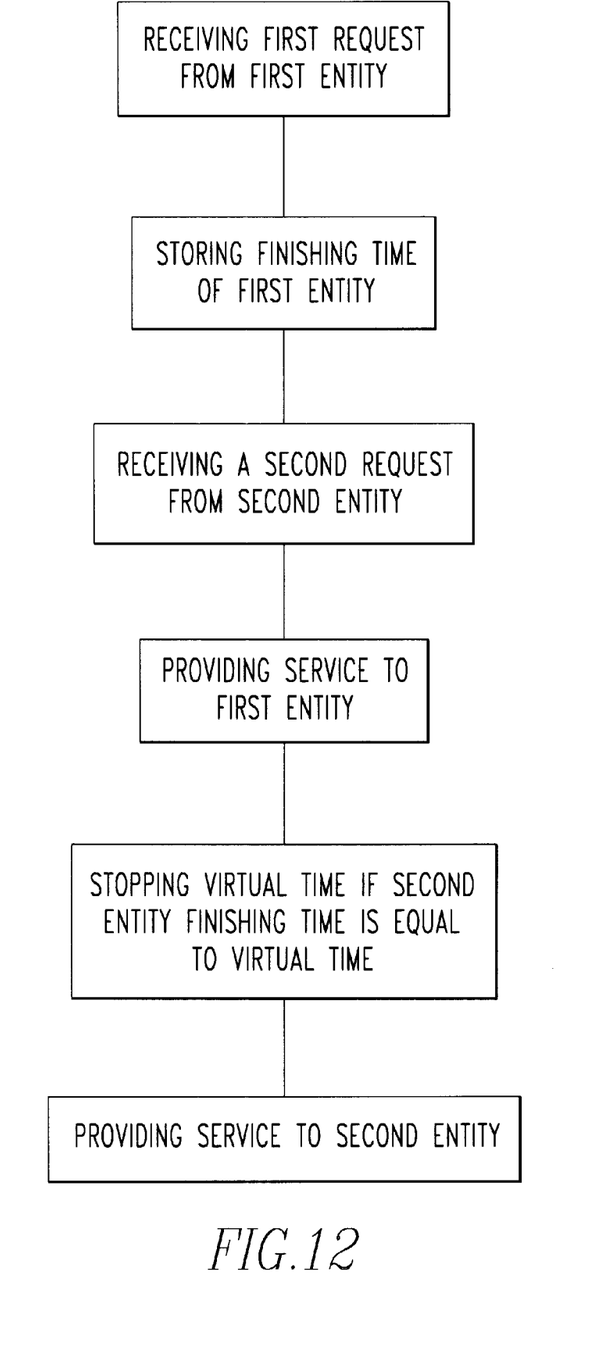
FIG. 12 is a flow chart of a method of the present invention.

The present invention pertains to a method for scheduling service from a server 14, as shown in FIG. 12. The method comprises the steps of receiving a first request from a first entity 121 having a first rate for service from the server 14. Next there is the step of storing a finishing time in a memory 16 by when the first entity 121 is to receive service from the server 14. Then there is the step of receiving a second request from a second entity having a second rate for service from the server 14. Next there is the step of storing the finishing time when the second entity is to receive service from the server 14 in the memory 16. Then there is the step of providing service to the first entity 121. Next there is the step of stopping virtual time. Then there is the step of providing service to the second entity from the server 14.

The invention allows overbooking by allowing the sum of rates of the entities 12 be greater than 1. The step of providing service to the first entity 121 preferably includes the step of providing service to a first connection of the first entity 121 and then providing service to a second connection of the first entity 121. Preferably, before the step of providing service to the first entity 121, there is the step of determining whether the first entity 121 has a finishing time which is the earliest finishing time of entities 12 with finishing times.

In the operation of the preferred embodiment, the main problem with rate limiting and overbooking in prior art schedulers is the advancement of their virtual clock potentially beyond the range of the start and finish times of the sessions. A new virtual clock 18 function is described herein, that ensures connections or sessions of entities 12 being treated fairly with overbooking. The new virtual clock 18 function is based on the concept of slowing down the clock to keep pace with the slower service to overbooked sessions. In this manner, newly arriving sessions, using the clock to timestamp their start time, no longer remain at an unfair advantage.

The virtual clock 18 computation is augmented to apply a minimum function to it and the smallest finish time among all active sessions. Thus, the virtual clock 18 function is as follows:

$$V(t+1)=\min(V(t)+1, \text{minF}), \quad (1)$$

where minF denotes the smallest finish time among all backlogged sessions. The slowdown of the virtual clock 18 based on minimum finish time is to keep it in the range of the finish times of sessions. Thus, a session becoming active is not stamped a start/finish time much further ahead than the start/finish times of already active sessions. This avoids starvation of such sessions. The service rate seen by active sessions is determined as the requested rate divided by the instantaneous overbooking factor.

The example discussed above is now illustrated in FIG. 4 with the new virtual clock 18 implementation.

Figure 4:
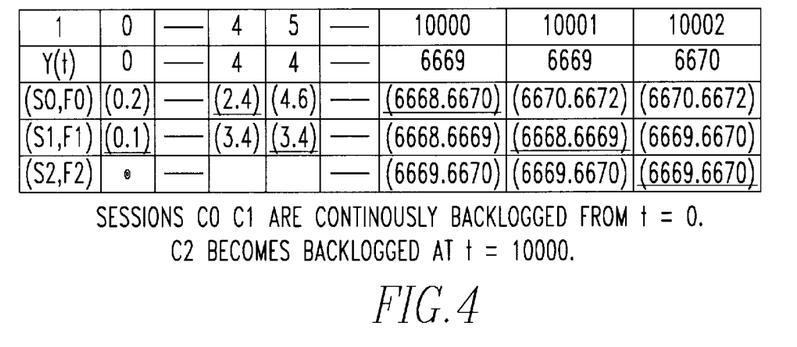
FIG. 4 is an example illustrating the behavior of sessions with the new implementation of rate limiter with overbooking. The virtual clock function in this implementation is not allowed to move ahead of the minimum finish time of active sessions. Row 1 depicts progression in real time (t). Row 2 depicts corresponding values of V(t), same as t in this example. Rows 3, 4, and 5 depict the start and finish times for sessions C0, C1, and C2, respectively.

The V(t) never exceeds the minimum finish time among active sessions. Thus, at time t=10,000, the value of V(t) is limited by the minimum finish time of session C1 of 6669.

Session C2 becoming active at such later time of t=10,000 is stamped a start time equal to V(t)=6669.

In this implementation C2 gets serviced at time 10,002, instead of 15,000. Thus, there is no arbitrary starvation seen by a session.

As discussed earlier, rate-limiting may need to be performed at the level of a single session and also at the level of a set of sessions bound to the same destination, e.g. a lower speed downstream port like T1 or an xDSL pipe. Such a group of sessions is referred to as a virtual link. Hierarchical rate limiting requires limiting the rate at the aggregate virtual link (VL) level and also at the individual sessions in the VL. Overbooking among VLs is allowed in RL. In case of overbooking, the bandwidth available to the RL is divided among the VLs in proportion to their respective VL rate allocations. Similarly, overbooking among sessions in a VL is also allowed. In case of overbooking, the bandwidth available to the VL is divided among the sessions in proportion to their respective rate allocations.

EXAMPLE

Figure 5:
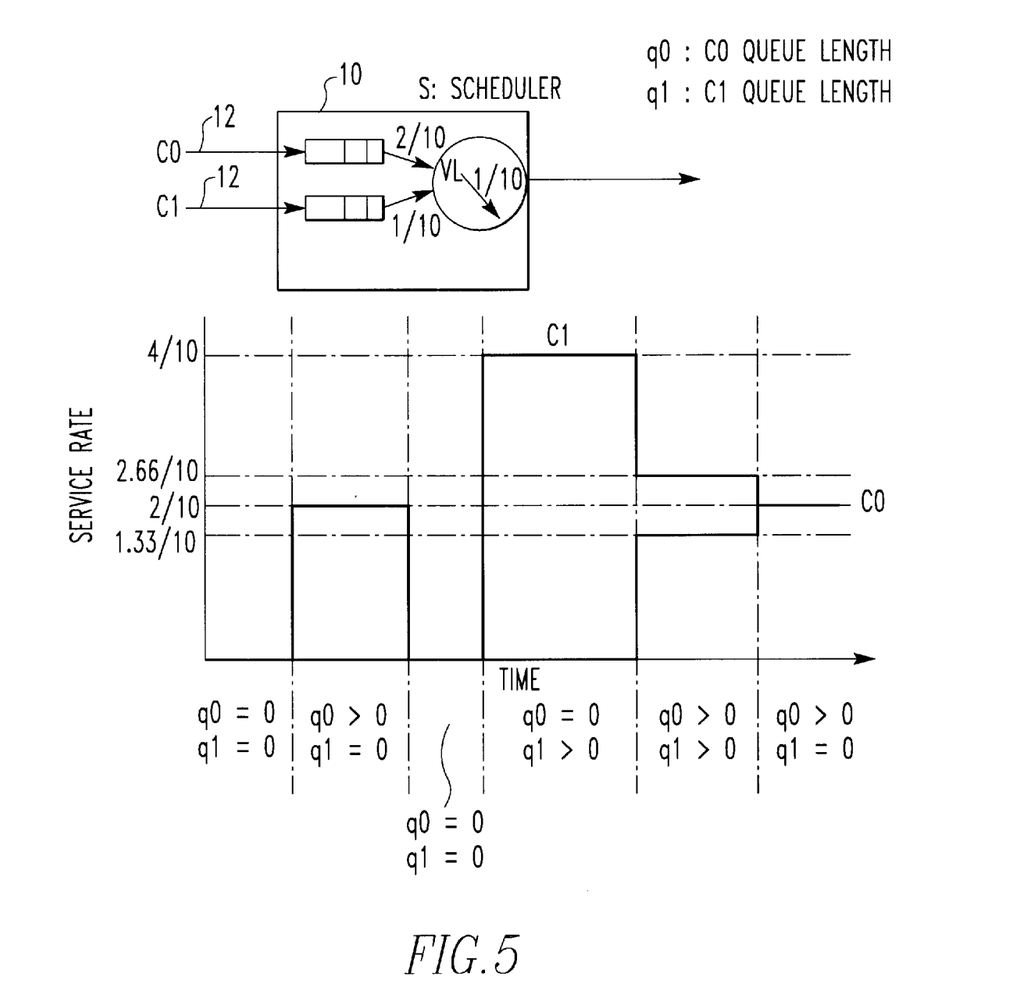
FIG. 5 is an example illustrating desired behavior in presence of overbooking inside a rate limited VL. Sessions C0 and C1 request rate limits of 2/10 and 4/10 of line rate, respectively, inside a VL rate limited to 4/10 line rate. Thus, when both are active simultaneously the VL is overbooked. During such periods they receive 1.33/10 and 2.66/10 of line rate, respectively. Otherwise, they receive service at their requested rate limits.

FIG. 5 provides an example to illustrate the behavior of overbooking a rate limited VL. Two sessions C0 and C1 belong to the same VL on a port. The arriving cells are buffered in separate queues. The VL is to be rate limited to 4/10 line rate. Sessions C0 and C1 are limited to rates of 2/10 and 4/10 of line rate, respectively. This implies that at times when only C0 has cells in its queue, it is limited to a rate of 2/10. Similarly, when only C1 has cells in its queue, it is limited to a rate of 4/10. However, when both sessions have cells, the VL rate is overbooked by a factor of (2/10+4/10)/(4/10)=1.5. The service received by sessions are scaled back by the overbooking factor. In this situation, C0 and C1 receive 1.33/10 and 2.66/10 line rate, respectively. Note that sum of these rates is 4/10, thus, the limit on the rate of the VL is always maintained.

Figure 6:
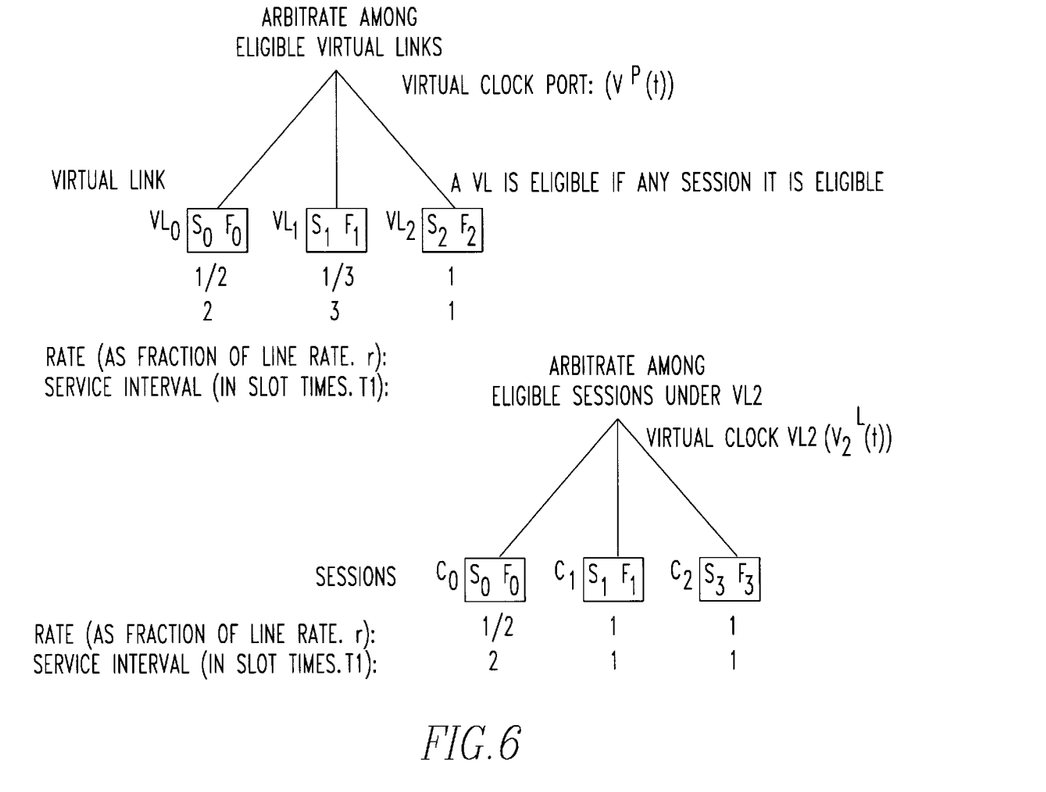
FIG. 6 is a hierarchical Rate Limiter (RL) implementation supporting overbooking among VLs and additionally among sessions under a VL. The port reference clock is $V^P(t)$. Each virtual link, $VL_i$, has its own reference clock, $V^L_i(t)$.

An implementation of the Rate Limiter (RL) at virtual link (VL) level is obtained by replacing sessions in the earlier scheme by virtual links. The VL is served exactly as a session would have been earlier. The virtual link with smallest finish time among eligible virtual links is chosen to be served. The reference virtual clock 18 at the port level which was earlier denoted as V(t), is denoted as $V^P(t)$ instead, to facilitate distinction in further discussion from virtual link clocks. As mentioned earlier, overbooking among VLs is allowed in RL. In case of overbooking, the bandwidth available to the RL is divided among the VLs in proportion to their respective VL rate allocations.

Once a VL is determined, a second level decision is made to determine which session under the VL to serve out. In a preferred embodiment, a similar scheme is replicated under a VL to arbitrate among sessions. Each virtual link has its own reference virtual clock 18. For $VL_i$ this is denoted as $V^L_i(t)$. Sessions in $VL_i$ are time stamped based on $V^L_i(t)$. As mentioned earlier, overbooking among sessions in a VL is allowed. In case of overbooking, the bandwidth available to the VL is divided among the sessions in proportion to their respective rate allocations. A separate reference clock for each virtual link allows sessions under different links to be treated independently. This allows different levels of overbooking under different virtual links. The overall scheme is shown in FIG. 6. The corresponding pseudo-code for the preferred embodiment is presented in the Appendix.

The following are other key features:

Analogous to maintaining and scheduling only active sessions, active virtual links are only considered while arbitrating among at the first level.

A virtual link is active if there exists some session under it that is active and eligible. The motivation behind this definition being that if this virtual link is scheduled, then it is assured that a session under it can also be scheduled in the second level arbitration, and the cycle will not be wasted.

The process of determining if a $VL_i$ is active can be determined in the following manner:

Keeping track of the minimum start time among all sessions under the virtual link. Let this be denoted by minSv. The comparison (minSv$\leq V^L_i(t)$) being true indicates that at least some session under the VL is eligible.

Keeping track if link is not empty, EMPTY(i)=FALSE, that is, if there exists an active session under it. The parameter minSv is valid only if EMPTY(i)=FALSE.

Thus, a VL is active if, ACTIVE(i)=((EMPTY(i)=FALSE)&&(minSv$\geq V^L_i(t)$))

The port system clock, used to measure the eligibility of the virtual links, is updated every cell time:

$$V^P(t30\ 1)=\min(V^P(t)+1, \min FT),$$

where, minFT is the minimum finish time among all active virtual links.

As stated earlier, to allow overbooking, a separate independent virtual clock 18 for each VL is maintained. All VL clocks are updated every cycle based on:

$$V^L_i(t30\ 1)=\min(V^L_i(t)+1, \min Fv),$$

where minFv is the minimum finish time among all active sessions under VL i. With a large number of virtual links, the above operation becomes difficult with limited number of minimum comparators in hardware. The hardware requirements can be reduced by using a clever scheme. The virtual clocks 18 are blindly incremented each cycle for all VLs. Only when a virtual link is selected for service, the minimum operation with minFv is performed to get the correct value of $V^L_i(t+1)$, before using it in the second level arbitration among sessions. When sessions under a VL are overbooked, the scheme ensures the VL clock reflects the slow down to ensure desired overbooking operation.

In case the VLs together do not overbook the port. Each individual VL could still be overbooked depending on the sessions in it. However, sessions in an overbooked VL do not affect sessions in other VLs.

Figure 7:
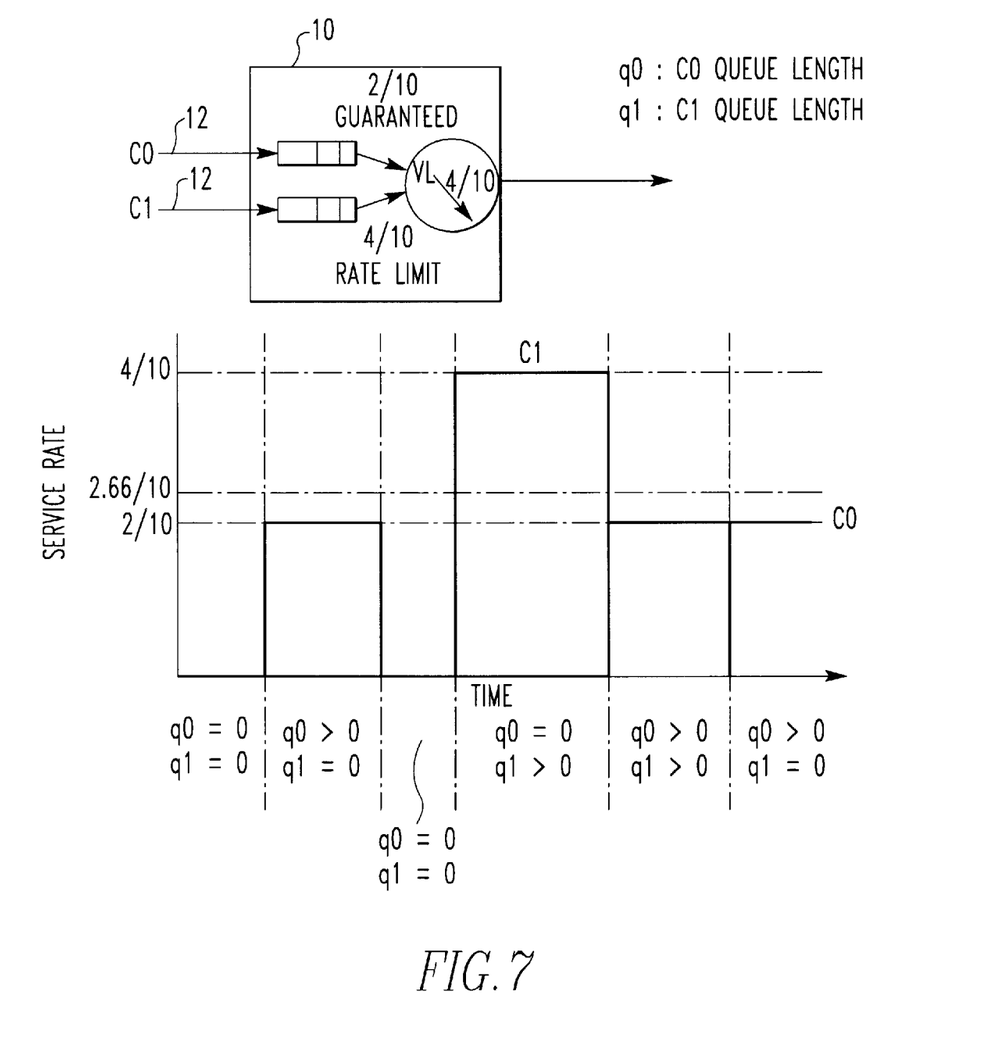
FIG. 7 is an example illustrating desired behavior in the presence of overbooking inside a rate limited VL. Session C0 requests a rate guarantee of 2/10 and session C1 a rate limit of 4/10 of line rate, inside a VL rate limited to 4/10 line rate. Thus, when both are active simultaneously the VL is overbooked. During such periods C0 continues to receive its 2/10 line rate guarantee, while C1 only receives 2/10 of line rate, respectively.

Degradation in service rate with overbooking may not be acceptable to some time sensitive sessions e.g. CBR, rt-VBR. Such sessions should be given higher priority in receiving service such that their service rates can be met. The problem becomes more challenging when such sessions are part of a virtual link. FIG. 7 provides an example to illustrate the behavior of overbooking a rate limited VL and a session in it requesting guaranteed service.

EXAMPLE

Two sessions C0 and C1 belong to the same VL on a port. The arriving cells are buffered in separate queues. The VL is to be rate limited to 4/10 line rate. Session C0 requests a rate guarantee of 2/10 and session C1 a rate limit of 4/10 of line rate. This implies that at times when only C0 has cells in its queue, it is limited to a rate of 2/10. Similarly, when only C1 has cells in its queue, it is limited to a rate of 4/10. However, when both sessions have cells, sessions C0 continues to receive 2/10 of line rate. The remainder of the VL rate is 4/10−2/10=2/10 is received by C1. Note that sum of these rates is 4/10, thus, the limit on the rate of the VL is always maintained. A mechanism to achieve such hierarchical rate limiting with overbooking while ensuring guarantees is described below.

It should also be noted that two relationships are necessarily implied among the rates in the scheduler 10:

Sum total of session guarantees in a virtual link is less than the rate limit on the virtual link. Thus, in the example above session C0 cannot ask for more than 4/10 of line rate, the rate of its VL.

The sum total of all guarantees on all sessions is less than line rate.

Figure 8:
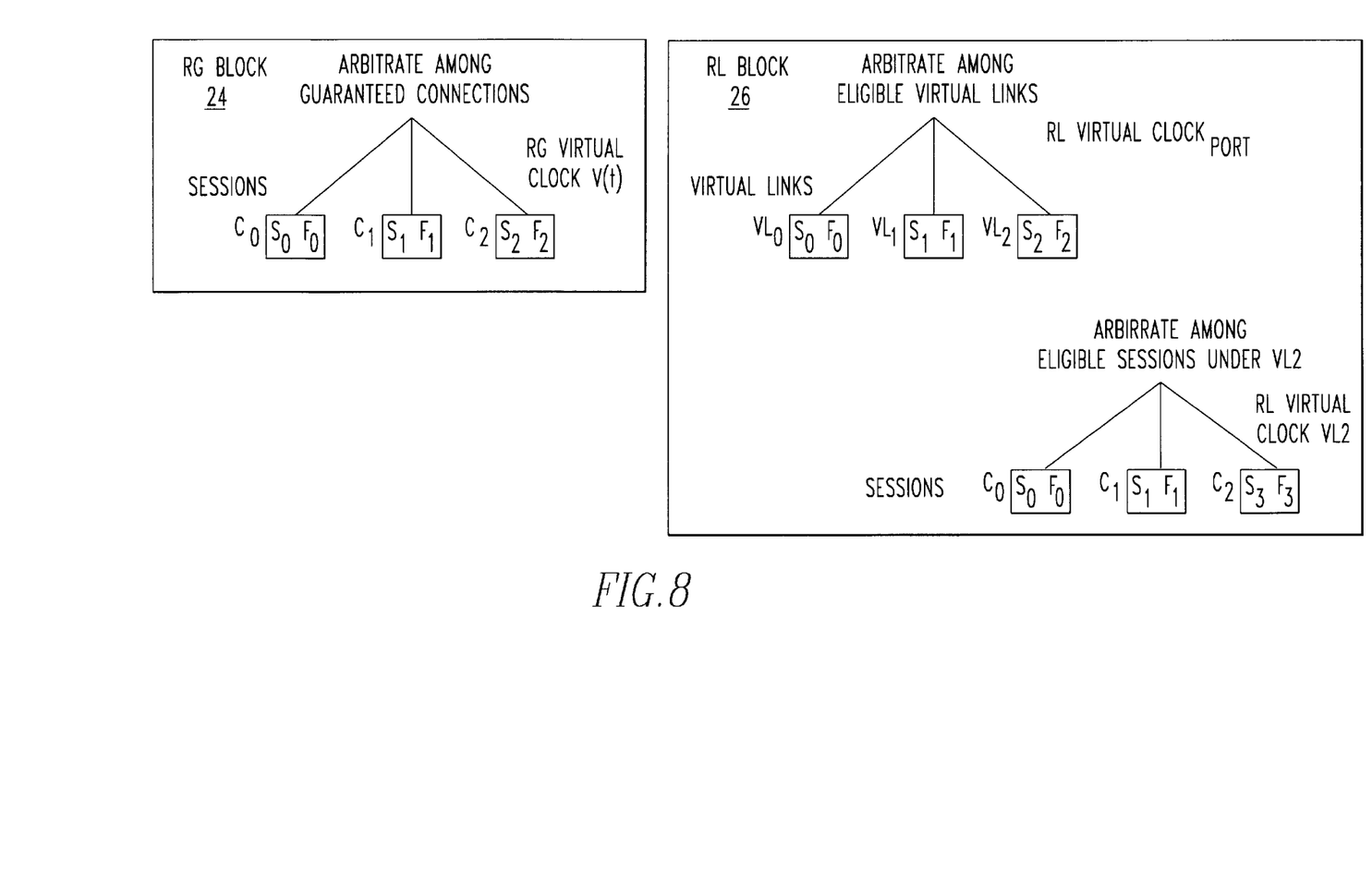
FIG. 8 is an embodiment to allow hierarchical rate limiting and overbooking and additionally support rate guaranteed sessions. Sessions in the RG block get higher priority over RL block. For a session being served out of RG, if it also belongs to a VL, the corresponding start time of the VL is updated in the RL. Such accounting limits the additional bandwidth that the VL can obtain via the RL, so as to remain within its rate limit.

To the previous embodiment, referred to here on as RL block 26, a RG block 24 is added with objective to meet the guarantees of individual sessions. The RG block 24 should not be overbooked. The RG block 24 is implemented as a flat scheme discussed earlier. It has its own reference virtual clock 18. The overall scheme is depicted in FIG. 8. The following additional constraints on RG block 24 and interactions with RL block 26 are as follows:

In a given cell slot, higher priority is given to serving RG over RL. Only if there are no eligible sessions in RG, are sessions under RL considered.

For a session being served out of RG, the corresponding start time of the VL is updated in the RL. This accounts for bandwidth received by the VL via its sessions in the RG. Additional bandwidth that the VL can obtain via the RL is limited to maintain total bandwidth below its rate limit.

As shown in FIG. 10, a hierarchy exists regarding the scheduler. In this architecture the primary controller 20 for a port can be connected to one or more additional controllers 20 instead of connections 19, and if desired, one or more of these additional controllers can be connected in turn to controllers, and so on. Each connection which requires service stores a time interval, start time and finishing time in the memory 16 associated with the controller 20 to which the connection first connects in the scheduler 10. A controller 20, connected, instead of a connection, to a lower level controller 20, similarly, stores a time interval, start time, and finishing time in the memory 16 associated with the controller 20 at the lower tier.

A controller 20 at a given tier determines eligibility for receiving service if any connection 19 or controller 20 connected to it at the next higher tier (away from the port), is eligible to receive service. The controller 20 determining eligibility to receive service, communicates it to the controller 20 to which it is connected at the next lower tier (closer to the port).

In any given slot time, the decision to provide service propagates from the primary controller 20, through intermediate controllers until it terminates at a connection. The primary controller based on the eligibility information and earliest finish time in its memory 16, decides which entity directly connected to it at the next higher tier is to receive service. It then updates the start and finish time of the entity in its local memory. If the chosen entity is another controller 20 in the next tier, it in turn, based on eligibility information and earliest finish times in its memory 16, makes a similar decision as to which entity directly connected to it at the next higher tier is to receive service. The decision process thus propagates through the hierarchy. It terminates when a connection is chosen for service. Thus, the hierarchical architecture allows flexibility to delegate bandwidth in a hierarchical manner. A set of connections under a given controller 20 can cumulatively be limited to a certain rate, by programming a time interval corresponding to such rate in the connecting controller 20 at the next lower tier.

It should be noted that each virtual clock for its associated controller maintains virtual time independent of all other virtual clocks of other controllers of different tier or the same tier. Every slot time, all virtual clock are updated as described in equation (1) based on finish times of eligible entities connected to it. Equation (1) requires an increment and a minimum operation to be performed for each virtual clock 18 in the scheduler. With a large number of virtual links, the above operation becomes expensive to be implemented in hardware. The hardware requirements can be reduced by using the following scheme. All virtual clocks 18 are blindly incremented each slot time. The minimum operation is performed on a virtual clock 18, to obtain the correct value of the clock, when its controller 20 receives service. This allows the controller to use the correct value of the clock in the next level of arbitration. When entities under a controller are overbooked, the scheme ensures the virtual clock reflects the slow down to ensure desired overbooking operation.

Figure 11:
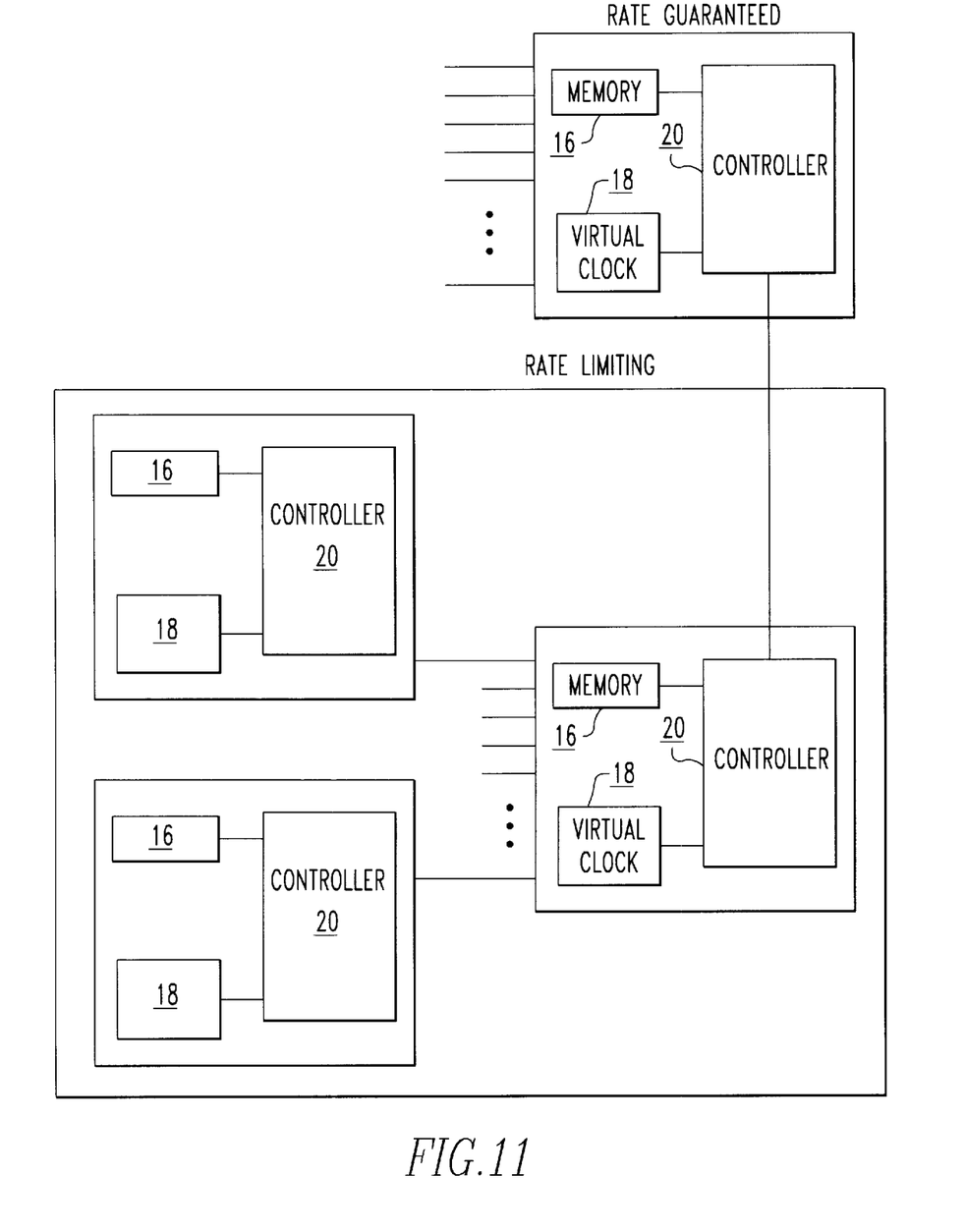
FIG. 11 is a schematic representation of a scheduler having a hierarchal architecture with a rate guaranteed portion.

Referring to FIGS. 8 and 11, guaranteed service can be established with a hierarchical architecture described above. In this embodiment, connections requiring guaranteed rate of service are connected to a rate guaranteed controller 20 separate from the primary controller and lower tier controllers of the rate limited controllers. At each slot time, before the primary tiered rate limited controller 10 proceeds with any connection under it, the rate guaranteed controller 20 is checked first to see if there are any rate guaranteed connections to receive service. If there are, these connections will receive service first from the server 14 before any connections of the rate limited controller will receive service from the server 14. If a rate guaranteed connection also belongs to set(s) of connections to be rate limited to a particular rate, the controllers 20 in the rate limiter along the hierarchy controlling the rate received by the such connections, update start and finish times to account for received service.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

---

Appendix

Pseudo-code for Flat Rate Limiter Implementation
Supporting Overbooking

---

```
SELECT SESSION ( )
begin
for i = 1 to N_ACTIVE SESSIONS
    if S_i ≤ V(t) /= Among eligible sessions only =/
        if F_i < F_j
            j = i
        else if F_i = F_j
            then if S_i < S_j
                j = i
    else
        none eligible for scheduling
return j
end
SCHEDULE SESSION (j)
begin
TRANSMIT_HEAD_CELL(j)
New Start time for j = S_j = TI;
New Finish time for j = F_j = TI_j;
if BACKLOGGED(j) = FALSE /= session became empty =/
    then
        remove session from scheduler
end
CELL_ARRIVAL(Session i)
begin
ENQUEUE_CELL(i,G)
if BACKLOGGED(i)= FALSE /= Currently session is empty =/
    then
        S_i=max(S_i,V_t)
        Insert session into scheduler
    else /= Session not empty, is already in scheduler =/
end
UPDATE_CLOCK( )
begin
V(t)=min.(V(t)+1,min.F;of active sessions )
end
```

---

Pseudo-code for Hierarchical Rate Limiter Implementation
Supporting Overbooking at both levels

---

```
SELECT_VIRTUAL_LINK ( )
begin
for i = 1 to VIRTUAL_LINKS
    if ACTIVE_VIRTUAL_LINK (i) /=Among active VLs only =/
        if S_i ≤ V^P(t) /= Among eligible VLs only =/
            if F_i < F_j
                j=i
            else if F_i = F_j
                then if S_i < S_j
        else
            none eligible for scheduling
return j
end
ACTIVE_VIRTUAL_LINK(i)
begin
    (MinSv ≤ V_i^L(t)) && (EMPTY(i) = FALSE)
    /= MinSv: Min Start Time among all sessions in VL i =/
end
SCHEDULE_VIRTUAL_LINK (j)
begin
    i = SELECT_SESSION_UNDER_VIRTUAL_LINK (j) ( )
    SCHEDULE_SESSION (i)
    S_j=S_j+TI_j /=update VL start time =/
    F_j=F_j+TI_j /=update VL finish time =/
end
    :
    :
SELECT_SESSION_UNDER_VIRTUAL_LINK (j)
begin
for i = 1 to N_ACTIVE_SESSIONS under VL j
    if S_i ≤ V_j^L(t) /= Among eligible sessions only =/
        if F_i < F_k
            k=i
        else if F_i = F_k
            then if S_i < S_k
                k=i
    else
        none eligible for scheduling
return k
end
SCHEDULE_SESSION (j)
begin
    TRANSMIT_HEAD_CELL(j)
    New Start time for this session = S_j+TI_j
    New Finish time for this session = F_j+TI_j
    if BACKLOGGED(j) = FALSE /= session became empty =/
        then
```

```
                                    -continued remove session from scheduler
end
CELL_ARRIVAL(Session i, VL j)
begin
ENQUEUE_CELL(i,G)
if BACKLOGGED(i)=FALSE /= Currently session is empty =/
    then
        S_i=max(S_i,V_j^L(t))
        Insert session into scheduler
    else /= Session not empty, is already in scheduler =/
end
UPDATE_CLOCKS( )
begin
        /= Update Port clock, V^P(t) =/
        V^P(t)=min.(V^P(t)+1,min.F among active VLs)
        /= Update virtual link clocks =/
        for i = 1 to VIRTUAL_LINKS
            V_i^L(t)+min.(V_i^L(t)+1,min.Fv among active sessions
            in VL_i)
end
```

What is claimed is:

1. A scheduler for controlling when entities are operated upon by a server comprising:

N entities, where N is an integer greater than or equal to 1, each entity having a rate at which it is to receive service from the server;

a memory having finishing times $f_i$ of the N entities, where $f_i$ corresponds to the time the i'th entity is to be operated upon by the server;

a virtual clock that keeps track of virtual time so the finishing times $f_i$ can be identified; and a controller which chooses entities to be operated upon by the server as a function of the finishing times, said controller slowing virtual time to provide service to the entities, said controller connected to the virtual clock and the memory.

2. A scheduler as described in claim 1 wherein each entity has a rate for requesting service from the server, with the sum of rates of said entities able to be greater than 1.

3. A scheduler as described in claim 2 wherein the controller causes virtual time to stop until all entities having a finishing time equal to virtual time have received service from the server.

4. A scheduler as described in claim 3 wherein the controller provides service to each entity as a function of each entity's rate and the amount the sum of the rates is greater than 1.

5. A scheduler as described in claim 4 wherein the controller operates virtual time corresponding to $$V(t+1)=\min(V(t)+1, \text{min}F),$$

where minF denotes the earliest finish time among all entities having finishing times.

6. A scheduler as described in claim 5 wherein the memory has starting times $s_i$ of the N entities, where $1 \leq i < N$ and is an integer, and $s_i$ corresponds to the earliest time when the i'th entity can request next service from the server and the memory has rate limit times $TI_i$ of the N entities.

7. A scheduler as described in claim 6 wherein the controller provides service to the entity with the earliest finishing time.

8. A scheduler as described in claim 7 wherein there is a hierarchy of controllers such that at least a first entity of the N entities represents a plurality of entities in a controller in a second tier, and a second entity in the second tier represents entities in a controller in a third tier wherein a connection requiring service storing a time interval and start time in a memory associated with the controller to which the connection first connects in the scheduler, a controller connected to a lower level controller stores a time interval, start time, in the memory associated with the controller at the lower tier.

9. A hierarchical scheduler as described in claim 8 wherein the controller at the first tier chooses a first entity to provide service when the entity is eligible and has earliest finish time of entities waiting for service, updating the start and finish time of the entity in its local memory; the first entity including another controller in the next tier, the other controller further chooses a second entity to provide service when the second entity is eligible and has earliest finish time of entities waiting for service at the second controller, updating the start and finish time of the entity in its local memory.

10. A hierarchical scheduler as described in claim 9 wherein each controller maintains a virtual clock independent of all other virtual clocks of other controllers of different tier or the same tier with all virtual clocks being updated based on finish times of eligible entities connected to it.

11. A hierarchical scheduler as described in claim 10 wherein all virtual clocks are incremented each cycle time, the minimum operation being performed on a virtual clock, to obtain the correct value of the clock, when its controller receives service, allowing the controller to use the correct value of the clock in a next level.

12. A hierarchical scheduler as described in claim 9 wherein the sum of rates of entities at a controller can be greater than 1, thus allowing the scheduler to be overbooked, and during congestion the controller ensures slowdown of virtual clock to reflect overbooking behavior.

13. A hierarchical scheduler as described in claim 12 wherein the rate received by an entity with no overbooking is equal to its rate but with overbooking the rate received by an entity is the minimum of its rate or its rate scaled down by the sum of rates of eligible entities at the controller.

14. A scheduler as described in claim 13 wherein at least one of the entities is guaranteed service from the server when it has a finishing time with the earliest finishing time of the entities waiting for service.

15. A scheduler as described in claim 14 wherein the entity which is guaranteed service is reviewed first by the controller when the controller is determining which entity is to receive service next to identify if the entity which is guaranteed service has the earliest finishing time of the entities waiting for service.

16. A scheduler for controlling when entities are operated upon the server comprising:

N entities, where N is an integer greater than or equal to 1, each entity having a rate at which it is to receive service from the server, at least a first entity of the N entities has a plurality of connections, and the controller chooses the first entity to provide service when at least one of the plurality of connections is waiting for service and has a finishing time which is the earliest finishing time of the entities waiting for service;

a memory having finishing times $f_i$ of the N entities, where $f_i$ corresponds to the time the i'th entity is to be operated upon by the server;

a virtual clock that keeps track of virtual time so the finishing times $f_i$ can be identified; and a controller which chooses entities to be operated upon by the server as a function of the finishing times, said controller slowing virtual time to provide service to the entities, said controller connected to the virtual clock and the memory.

17. A method for scheduling service from a server comprising the steps of:

receiving a first request from a first entity having a first rate for service from the server;

storing a finishing time in a memory when the first entity is to receive service from the first entity;

receiving a second request from a second entity having a second rate for service from the server;

providing service to the first entity;

stopping virtual time if second entity's finishing time is equal to virtual time; and providing service to the second entity.

18. A method as described in claim 17 wherein the sum of rates of the entities is greater than 1.

19. A method as described in claim 14 wherein the step of providing service to the first entity includes the step of providing service to a first connection of the first entity and then providing service to a second connection of the first entity.

20. A method as described in claim 16 wherein before the step of providing service to the first entity, there is the step of determining whether the first entity has a finishing time which is the earliest finishing time of entities with finishing times.

* * * * *